US006694342B1

(12) United States Patent
Mou (10) Patent No.: US 6,694,342 B1
(45) Date of Patent: Feb. 17, 2004

(54) SCALED FORWARD AND INVERSE DISCRETE COSINE TRANSFORM AND VIDEO COMPRESSION/DECOMPRESSION SYSTEMS EMPLOYING THE SAME

(75) Inventor: Alex Z. Mou, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 398 days.

(21) Appl. No.: 09/690,351

(22) Filed: Oct. 16, 2000

Related U.S. Application Data (63) Continuation of application No. 08/874,382, filed on Jun. 13, 1997, now Pat. No. 6,134,270.

(51) Int. Cl.[7] .............................................. G06F 17/14
(52) U.S. Cl. ....................................... 708/402; 382/250
(58) Field of Search ........................... 708/402; 382/250

(56) References Cited

U.S. PATENT DOCUMENTS

| | | | |
|---|---|---|---|
| 4,829,465 A | | 5/1989 | Knauer |
| 5,117,381 A | | 5/1992 | Juri et al. |
| 5,483,475 A | | 1/1996 | Kao |
| 5,590,066 A | * | 12/1996 | Ohki .......................... 708/401 |
| 5,596,517 A | | 1/1997 | Jones et al. |
| 5,610,849 A | | 3/1997 | Huang |
| 5,754,456 A | * | 5/1998 | Eitan et al. ................. 708/402 |
| 6,119,140 A | * | 9/2000 | Murata et al. .............. 708/402 |
| 6,134,270 A | * | 10/2000 | Mou ...................... 375/240.21 |
| 6,160,920 A | * | 12/2000 | Shyu .......................... 382/250 |
| 6,445,829 B1 | * | 9/2002 | Shyu .......................... 382/250 |

FOREIGN PATENT DOCUMENTS

| | | |
|---|---|---|
| EP | 0 366 435 | 5/1990 |
| EP | 0 416 311 | 3/1991 |
| EP | 0 468 165 | 1/1992 |
| GB | 2 304 946 | 3/1997 |

OTHER PUBLICATIONS

Hung, et al, "Statistical Inverse Discrete Cosine Transforms for Image Compression," SPIE, vol. 2187, pp 196–205.
Arai, et al., "A Fast DCT–SQ Scheme for Images," The Transactions of the IEICE, vol. E 71, No. 11, Nov. 1988, pp. 1095–1097.
European Search Report for Application No. 98 30 4650 mailed Aug. 25, 1999.

* cited by examiner

Primary Examiner—David H. Malzahn
(74) Attorney, Agent, or Firm—Meyertons Hood Kivlin Kowert & Goetzel, P.C.; B. Nöel Kivlin (57) ABSTRACT

A system and method of a forward and/or inverse discrete cosine transform in a video system. In one embodiment, an array of DCT transform coefficients are converted to a two dimensional array of spatial data. The array of DCT transform coefficients are first operated upon by a pre-scale computation unit (implemented in either hardware or software) which multiplies a set of predetermined pre-scale constants with the input coefficients. The pre-scale constants multiplied by the input DCT coefficient matrix form a symmetric pre-scale array. Upon pre-scaling using the symmetric pre-scale factor array, an intermediary array is composed by performing intermediary calculations upon each column vector of the pre-scaled array. The output of this intermediary calculation is composed to form an intermediary array. Subsequently, a set of calculations are performed row-wise upon each row vector of the intermediary array to thereby form the output array of spatial data. In one implementation, the array of pre-scale coefficients (i.e., the symetric pre-scale factor array) may be represented as the result of a matrix multiplication M×U×M, where the array U consists of a set of coefficients all equal to 1, and wherein the array M is an array of coefficients wherein the equal row-column diagonal of coefficients include a set of pre-scale constants and all other coefficients in the array are equal to 0. The pre-scale constants includes a set of constants expressed by the $\cos(n\pi/16)$, where n=1, 2, 3 and 4. In another embodiment, the calculations are reversed to perform a forward discrete cosine transform operation.

6 Claims, 10 Drawing Sheets

$$P = \begin{bmatrix} aa & ab & ac & ad & ae & af & ag & ah \\ ba & bb & bc & bd & be & bf & bg & bh \\ ca & cb & cc & cd & ce & cf & cg & ch \\ da & db & dc & dd & de & df & dg & dh \\ ea & eb & ec & ed & ee & ef & eg & eh \\ fa & fb & fc & fd & fe & ff & fg & fh \\ ga & gb & gc & gd & ge & gf & gg & gh \\ ha & hb & hc & hd & he & hf & hg & hh \end{bmatrix}$$

$$U = \begin{bmatrix} 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \\ 1 & 1 & 1 & 1 & 1 & 1 & 1 & 1 \end{bmatrix}$$

$$M = \begin{bmatrix} a & 0 & 0 & 0 & 0 & 0 & 0 & 0 \\ 0 & b & 0 & 0 & 0 & 0 & 0 & 0 \\ 0 & 0 & c & 0 & 0 & 0 & 0 & 0 \\ 0 & 0 & 0 & d & 0 & 0 & 0 & 0 \\ 0 & 0 & 0 & 0 & e & 0 & 0 & 0 \\ 0 & 0 & 0 & 0 & 0 & f & 0 & 0 \\ 0 & 0 & 0 & 0 & 0 & 0 & g & 0 \\ 0 & 0 & 0 & 0 & 0 & 0 & 0 & h \end{bmatrix}$$

$$\text{Prescaled Input Array} = \begin{bmatrix} aaI_{11} & abI_{21} & acI_{31} & adI_{41} & aeI_{51} & afI_{61} & agI_{71} & ahI_{81} \\ baI_{12} & bbI_{22} & bcI_{32} & bdI_{42} & beI_{52} & bfI_{62} & bgI_{72} & bhI_{82} \\ caI_{13} & cbI_{23} & ccI_{33} & cdI_{43} & ceI_{53} & cfI_{63} & cgI_{73} & chI_{83} \\ daI_{14} & dbI_{24} & dcI_{34} & ddI_{44} & deI_{54} & dfI_{64} & dgI_{74} & dhI_{84} \\ eaI_{15} & ebI_{25} & ecI_{35} & edI_{45} & eeI_{55} & efI_{65} & egI_{75} & ehI_{85} \\ faI_{16} & fbI_{26} & fcI_{36} & fdI_{46} & feI_{56} & ffI_{66} & fgI_{76} & fhI_{86} \\ gaI_{17} & gbI_{27} & gcI_{37} & gdI_{47} & geI_{57} & gfI_{67} & ggI_{77} & ghI_{87} \\ haI_{18} & hbI_{28} & hcI_{38} & hdI_{48} & heI_{58} & hfI_{68} & hgI_{78} & hhI_{88} \end{bmatrix}$$

SCALED FORWARD AND INVERSE DISCRETE COSINE TRANSFORM AND VIDEO COMPRESSION/DECOMPRESSION SYSTEMS EMPLOYING THE SAME

This application is a continuation of U.S. patent application Ser. No. 08/874,382, now U.S. Pat. No. 6,134,270 entitled "Scaled Forward and Inverse Discrete Cosine Transform and Video Compression/Decompression Systems Employing the Same" filed Jun. 13, 1997.

BACKGROUND OF THE INVENTION

1. Field of the Invention

The present invention relates generally to systems and methods for performing discrete cosine transform (DCT) and inverse discrete cosine transform (DCT) operations. The invention also relates to digital video compression and decompression, and more particularly to a video encoder and decoder for performing the discrete cosine transform and/or inverse discrete cosine transform with improved efficiency and reduced computational requirements.

2. Description of the Related Art

Full-motion digital video requires a large amount of storage and data transfer bandwidth. Thus, video systems use various types of video compression algorithms to reduce the amount of necessary storage and transfer bandwidth. In general, different video compression methods exist for still graphic images and for full-motion video. Intraframe compression methods are used to compress data within a still image or single frame using spatial redundancies within the frame. Interframe compression methods are used to compress multiple frames, i.e., motion video, using the temporal redundancy between the frames. Interframe compression methods are used exclusively for motion video, either alone or in conjunction with intraframe compression methods.

Intraframe or still image compression techniques generally use frequency domain techniques, such as the discrete cosine transform (DCT). Intraframe compression typically uses the frequency characteristics of a picture frame to efficiently encode a frame and remove spatial redundancy. Examples of video data compression for still graphic images are JPEG (Joint Photographic Experts Group) compression and RLE (run-length encoding). JPEG compression is a group of related standards that use the discrete cosine transform (DCT) to provide either lossless (no image quality degradation) or lossy (imperceptible to severe degradation) compression. Although JPEG compression was originally designed for the compression of still images rather than video, JPEG compression is used in some motion video applications. The RLE compression method operates by testing for duplicated pixels in a single line of the bit map and storing the number of consecutive duplicate pixels rather than the data for the pixels themselves.

In contrast to compression algorithms for still images, most video compression algorithms are designed to compress full motion video. As mentioned above, video compression algorithms for motion video use a concept referred to as interframe compression to remove temporal redundancies between frames. Interframe compression involves storing only the differences between successive frames in the data file. Interframe compression stores the entire image of a key frame or reference frame, generally in a moderately compressed format. Successive frames are compared with the key frame, and only the differences between the key frame and the successive frames are stored. Periodically, such as when new scenes are displayed, new key frames are stored, and subsequent comparisons begin from this new reference point. The difference frames are further compressed by such techniques as the DCT. Examples of video compression which use an interframe compression technique are MPEG, DVI and Indeo, among others.

MPEG Background

A compression standard referred to as MPEG (Moving Pictures Experts Group) compression is a set of methods for compression and decompression of full motion video images which uses the interframe and intraframe compression techniques described above. MPEG compression uses both motion compensation and discrete cosine transform (DCT) processes, among others, and can yield compression ratios of more than 200:1.

The two predominant MPEG standards are referred to as MPEG-1 and MPEG-2. The MPEG-1 standard generally concerns inter-frame data reduction using block-based motion compensation prediction (MCP), which typically uses temporal differential pulse code modulation (DPCM). The MPEG-2 standard is similar to the MPEG-1 standard, but includes extensions to cover a wider range of applications, including interlaced digital video such as high definition television (HDTV).

Interframe compression methods such as MPEG are based on the fact that, in most video sequences, the background remains relatively stable while action takes place in the foreground. The background may move, but large portions of successive frames in a video sequence are redundant. MPEG compression uses this inherent redundancy to encode or compress frames in the sequence.

An MPEG stream includes three types of pictures, referred to as the Intra (I) frame, the Predicted (P) frame, and the Bidirectional Interpolated (B) frame. The I or Intraframes contain the video data for the entire frame of video and are typically placed every 10 to 15 fames. Intrafames provide entry points into the file for random access, and are generally only moderately compressed. Predicted frames are encoded with reference to a past frame, i.e., a prior Intraframe or Predicted frame. Thus P frames only include changes relative to prior I or P frames. In general, Predicted frames receive a fairly high amount of compression and are used as references for future Predicted frames. Thus, both I and P frames are used as references for subsequent frames. Bi-directional pictures include the greatest amount of compression and require both a past and a future reference in order to be encoded. Bi-directional frames are never used as references for other frames.

In general, for the frame(s) following a reference frame, i.e., P and B frames that follow a reference I or P frame, only small portions of these frames are different from the corresponding portions of the respective reference frame. Thus, for these frames, only the differences are compressed and stored. The differences between these frames are typically generated using motion vector estimation logic, as discussed below.

When an MPEG encoder receives a video file or bitstream, the MPEG encoder generally first creates the I frames. The MPEG encoder may compress the I frame using an intraframe compression technique. After the I frames have been created, the MPEG encoder divides respective frames into a grid of 16×16 pixel squares called macroblocks. The respective frames are divided into macroblocks in order to perform motion estimation/compensation. Thus, for a respective target picture or frame, i.e., a frame being encoded, the encoder searches for an exact, or near exact, match between the target picture macroblock and a block in a neighboring picture referred to as a search frame. For a target P frame the encoder searches in a prior I or P frame. For a target B frame, the encoder searches in a prior or subsequent I or P frame. When a match is found, the encoder transmits a vector movement code or motion vector. The vector movement code or motion vector only includes information on the difference between the search frame and the respective target picture. The blocks in target pictures that have no change relative to the block in the reference picture or I frame are ignored. Thus the amount of data that is actually stored for these frames is significantly reduced.

After motion vectors have been generated, the encoder then encodes the changes using spatial redundancy. Thus, after finding the changes in location of the macroblocks, the MPEG algorithm further calculates and encodes the difference between corresponding macroblocks. Each macroblock is comprised of four subblocks, of size 8×8 each, for brightness or luminance signal and corresponding two, four or eight subblocks for color or chrominance signal depending on color formats. Encoding the difference is accomplished through a math process referred to as the discrete cosine transform or DCT. This process operates on each 8×8 block.

For frames which are used as references for other frames, the MPEG encoder is required to reverse the quantization and DCT transform on these blocks in order to recover the resultant pixel data. This resultant pixel data is used for motion estimation on subsequent frames, such as P and B frames. Thus MPEG encoders generally include inverse quantization logic as well as inverse DCT logic.

Therefore, MPEG compression is based on two types of redundancies in video sequences, these being spatial, which is the redundancy in an individual frame, and temporal, which is the redundancy between consecutive frames. Spatial compression is achieved by considering the frequency characteristics of a picture frame. Each frame is divided into non-overlapping blocks, and each block is transformed via the discrete cosine transform (DCT). After the transformed blocks are converted to the "DCT domain", each entry in the transformed block is quantized with respect to a set of quantization tables. The quantization step for each entry can vary, taking into account the sensitivity of the human visual system (HVS) to the frequency. Since the HVS is more sensitive to low frequencies, most of the high frequency entries are quantized to zero. In this step where the entries are quantized, information is lost and errors are introduced to the reconstructed image. Run length encoding is used to transmit the quantized values. To further enhance compression, the blocks are scanned in a zig-zag ordering that scans the lower frequency entries first, and the non-zero quantized values, along with the zero run lengths, are entropy encoded.

As discussed above, temporal compression makes use of the fact that most of the objects remain the same between consecutive picture frames, and the difference between objects or blocks in successive frames is their position in the frame as a result of motion (either due to object motion, camera motion or both). This relative encoding is achieved by the process of motion estimation. The difference image as a result of motion compensation is further compressed by means of the DCT, quantization and RLE entropy coding.

When an MPEG decoder receives an encoded stream, the MPEG decoder reverses the above operations. Thus the MPEG decoder performs inverse scanning to remove the zig zag ordering, inverse quantization to de-quantize the data, and the inverse DCT to convert the data from the frequency domain back to the pixel domain. The MPEG decoder also performs motion compensation using the transmitted motion vectors to re-create the temporally compressed frames.

Computation of the discrete cosine transform (DCT) as well as computation of the inverse discrete cosine transform (IDCN in video systems generally require a large amount of processing. For example, hundreds of multiplication (or division) operations as well as hundreds of addition (or subtraction) operations may be required to perform the DCT or DCT upon a single 8×8 array. Such computational requirements can be extremely time-consuming and resource intensive.

A new system and method are desired for efficiently computing the forward and/or inverse discrete cosine transform. It is particularly desirable to provide a system for computing the forward and/or inverse discrete cosine transform which reduces computational requirements in a video system.

SUMMARY OF THE INVENTION

The problems outlined above are in large part solved by a system and method of a forward and/or inverse discrete cosine transform in accordance with the present invention. In one embodiment, an array of DCT transform coefficients are converted to a two dimensional array of spatial data. The array of DCT transform coefficients are first operated upon by a pre-scale computation unit (implemented in either hardware or software) which multiplies a set of predetermined pre-scale constants with the input coefficients. The pre-scale constants multiplied by the input DCT coefficient matrix form a symmetric pre-scale array. Upon pre-scaling using the symmetric pre-scale factor array, an intermediary array is composed by performing intermediary calculations upon each column vector of the pre-scaled array. The output of this intermediary calculation is composed to form an intermediary array. Subsequently, a set of calculations are performed row-wise upon each row vector of the intermediary array to thereby form the output array of spatial data.

In one implementation, the array of pre-scale coefficients (i.e., the symetric pre-scale factor array) may be represented as the result of a matrix multiplication M×U×M, where the array U consists of a set of coefficients all equal to 1, and wherein the array M is an array of coefficients wherein the equal row-column diagonal of coefficients include a set of pre-scale constants and all other coefficients in the array are equal to 0. The pre-scale constants includes a set of constants expressed by the $\cos(\pi/16)$, where n=1, 2, 3 and 4.

In one embodiment, the intermediary calculation performed upon each column vector of the pre-scaled array includes:

$v0=b0+b4;$ $v4=b0-b4;$ $v2=b6*\tan(\pi*2/16)+b2;$ $v6=b6-b2*\tan(\pi*2/16);$ $v7=b1*\tan(\pi*1/16)-b7;$ $v1=b1+b7*\tan(\pi*1/16);$ $v5=-b3*\tan(\pi*3/16)+b5;$ $v3=b3+b5*\tan(\pi*3/16);$ $b0=v0+v2;$ $b2=v0-v2$;

$b4=v4+v6$;

$b6=v4-v6$;

$b3=v7+v5$;

$b5=(v7-v5)$;

$b1=(v1-v3)$;

$b7=v1+v3$;

$v5=(b1+b5)*\cos(\pi*4/16)$;

$v1=(b1-b5)*\cos(\pi*4/16)$;

output[0]=(b0+b7);

output[7]=(b0-b7);

output[1]=(b6+v5);

output[6]=(b6-v5);

output[2]=(b4+v1);

output[5]=(b4-v1);

output[3]=(b2+b3);

output[4]=(b2-b3);

wherein the input parameters b0–b7 represent the coefficients of each column vector of said pre-scaled array. Upon composition of an intermediary array by applying the operator expressed above upon each column vector of the pre-scaled array, the output array is calculated by applying the operator row-wise upon each row vector of the intermediary array. In another embodiment, the operator expressed above is first applied row-wise upon each row vector of the pre-scaled array to form an intermediary array. Subsequently, the operator is applied column wise upon each column vector of the intermediary array.

Since pre-scaling of the DCT input coefficients is performed using a symmetric pre-scale factor array before performing the column-wise and row-wise calculations, fewer overall multiplications are required since separate column-wise and row-wise pre-scale calculations are not performed. Accordingly, when employed within a video compression or decompression system, the inverse discrete cosine transform may be performed more efficiently and faster.

In another embodiment, the calculations are reversed to perform a forward discrete cosine transform operation. In such an embodiment, post-scaling upon an array of coefficients calculated using column-wise and row-wise calculations is performed. Again, since the overall number of calculations for performing the discrete cosine transform may be reduced, faster and more efficient video compression and decompression systems may be attained.

The fast forward or inverse discrete cosine transform methodology may be employed within a computation unit of a video encoder or decoder system, either in hardware or software. The DCT coefficients and resulting spatial data may be stored within a memory of the video encoder or decoder system. A video encoder or decoder employing the fast forward or inverse discrete cosine transform methodology in accordance with the present invention may advantageously achieve high performance.

BRIEF DESCRIPTION OF THE DRAWINGS

Other objects and advantages of the invention will become apparent upon reading the following detailed description and upon reference to the accompanying drawings in which:

FIG. 7 is a diagram illustrating a manner in which the symmetric pre-scale actor array may be expressed.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Video Compression System

Figure 1:
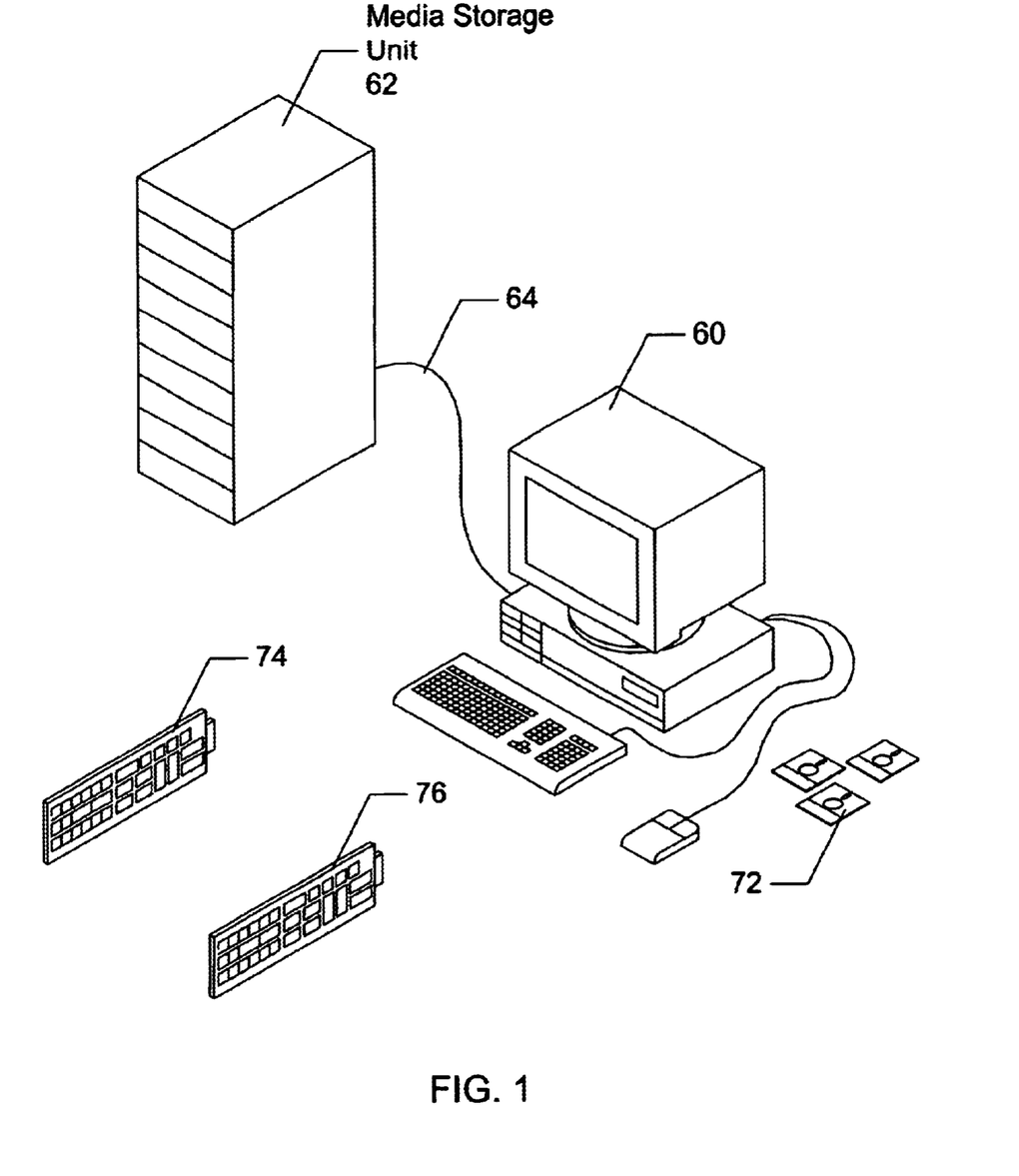
FIG. 1 is a diagram of a computer system which performs video decoding and video encoding.

Referring now to FIG. 1, one embodiment of a system for performing video compression and/or decompression operations according to the present invention is shown. The system performs computation of the forward and/or inverse discrete cosine transform during video encoding or video compression and/or video decoding or video decompression. In other embodiments, the system and method of the present invention may be used to perform DCT and IDCT operations for use in other various types of applications, as desired.

As shown, in one embodiment the video encoding/decoding system comprises a general purpose computer system 60. The video encoding/decoding system may comprise any of various types of systems, including a computer system, set-top box, television, or other device. In various embodiments, one or both of the video encoding and video decoding operations include the improved DCT and/or IDCT computation system and method of the present invention.

The computer system 60 is preferably coupled to a media storage unit 62 which stores digital video files which are to be decompressed or decoded by the computer system 60. The media storage unit 62 may also store the resultant decoded or decompressed video file. In the preferred embodiment, the computer system 60 receives a compressed video file or bitstream and generates a normal uncompressed digital video file. In the present disclosure, the term "compressed video file" refers to a video file which has been compressed according to any of various video compression algorithms which use motion estimation techniques, including the MPEG standard, among others, and the term "uncompressed digital video file" refers to a stream of decoded or uncompressed video.

As shown, the computer system 60 preferably includes a video decoder 74 which performs video decoding or decompression operations. In one embodiment, the video decoder 74 is an MPEG decoder. The computer system 60 optionally may also include a video encoder 76, which in one embodiment is an MPEG encoder. The video decoder 74 and video encoder 76 are preferably adapter cards coupled to a bus in the computer system, but are shown external to the computer system 60 for illustrative purposes. The computer system 60 also includes software, represented by floppy disks 72, which may perform portions of the video decompression or decoding operation, or performs portions of the video compression or encoding operation, and/or may perform other operations, as desired.

Figure 2:
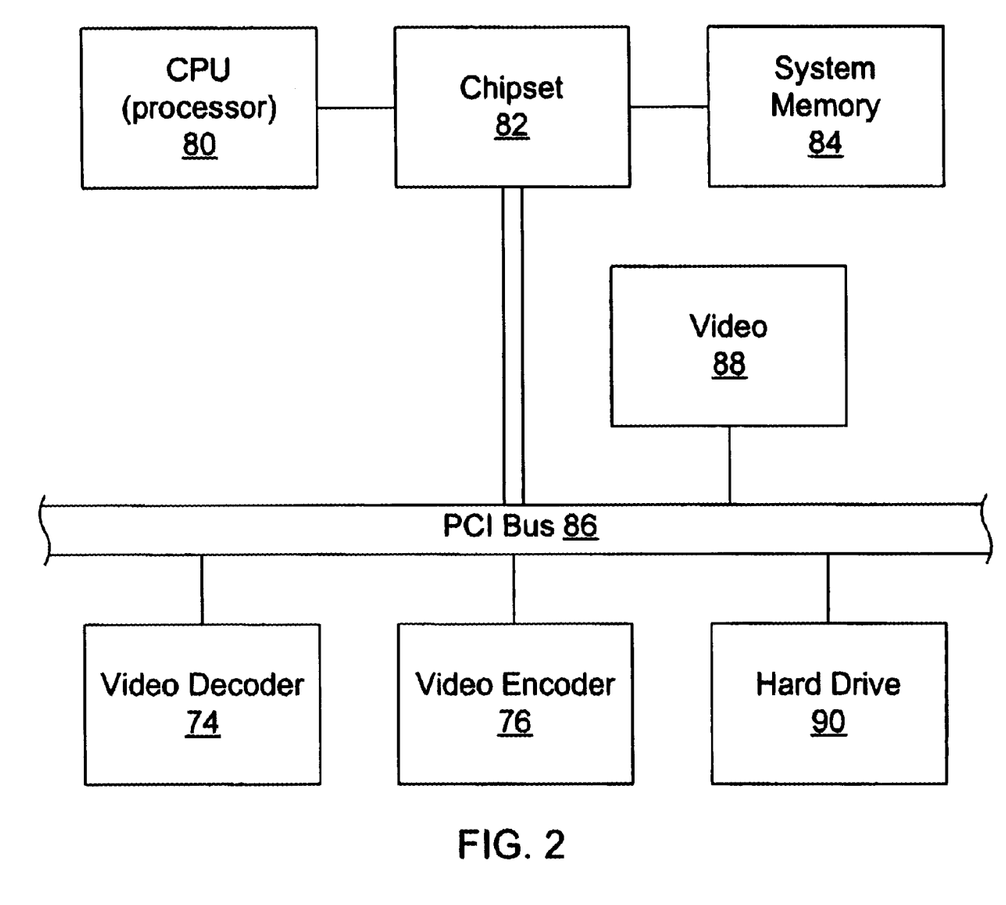
FIG. 2 is a block diagram illustrating the computer system of FIG. 1.

The computer system 60 preferably includes various standard components, including one or more processors, one or more buses, a hard drive and memory. Referring now to FIG. 2, a block diagram illustrating the components comprised in the computer system of FIG. 1 is shown. It is noted that FIG. 2 is illustrative only, and other computer architectures may be used, as desired. As shown, the computer system includes at least one processor 80 coupled through chipset logic 82 to a system memory 84. The chipset 82 preferably includes a PCI (Peripheral Component Interconnect) bridge for interfacing to PCI bus 86, or another type of bus bridge for interfacing to another type of expansion bus. In FIG. 2, video decoder 74 and video encoder 76 are shown connected to PCI bus 86. Various other components may be comprised in the computer system, such as video 88 and hard drive 90.

As mentioned above, in the embodiment of FIG. 1 the computer system 60 includes or is coupled to one or more digital storage or media storage devices. For example, in the embodiment of FIG. 1, the computer system 60 couples to media storage unit 62 through cable 64. The media storage unit 62 preferably comprises a RAID (Redundent Array of Inexpensive Disks) disk array, or includes one or more CD-ROM drives and/or one or more Digital Video Disk (DVD) storage units, or other media, for storing digital video to be decompressed and/or for storing the resultant decoded video data. The computer system may also include one or more internal RAID arrays, CD-ROM drives and/or may couple to one or more separate Digital Video Disk (DVD) storage units. The computer system 60 also may connect to other types of digital or analog storage devices or media, as desired.

Alternatively, the compressed digital video file may be received from an external source, such as a remote storage device or remote computer system. The computer system may include an input device, such as an ATM (Asynchronous Transfer Mode) adapter card or an ISDN (Integrated Services Digital Network) terminal adapter, or other digital data receiver, for receiving the digital video file. The digitalvideo file may also be stored or received in analog format and converted to digital data, either externally to the computer system 60 or within the computer system 60.

As mentioned above, the video decoder 74 in the computer system 60 performs video decoding or video decompression functions. In performing video decoding or video decompression, the video decoder 74 performs the inverse discrete cosine transform (IDCT) As discussed further below, the MPEG decoder 74 in the computer system 60 may compute the IDCT with improved performance.

As also mentioned above, the video encoder 76 in the computer system 60 performs video encoding or video compression functions. In performing video encoding or video compression, the video encoder 76 performs the discrete cosine transform (DCT) on certain data and the inverse discrete cosine transform (IDCT) on certain other data. As is also discussed further below, the video encoder 76 in the computer system 60 may compute the DCT and/or IDCT with improved performance.

It is noted that the system of FIG. 1 may comprise two or more interconnected computers, as desired. The system for encoding or decoding video data may alternatively comprise other hardware, such as a set top box, either alone or used in conjunction with a general purpose programmable computer. The system for encoding or decoding video data may be implemented within CPU 80 either entirely or partially in software for computation of encoding or decoding process. It is noted that any of various types of systems may be used for encoding and/or decoding video data according to the present invention, as desired.

Figure 3:
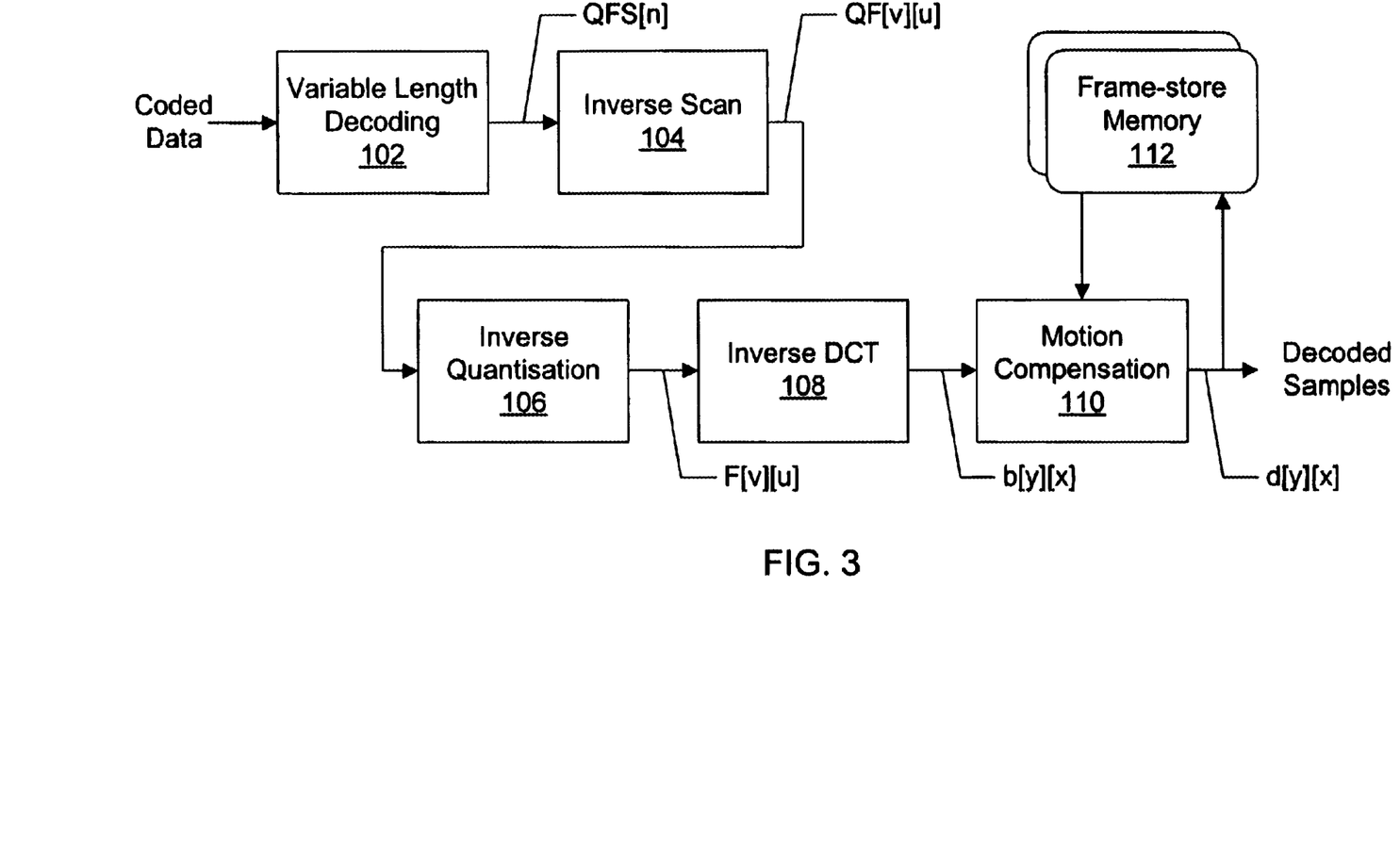
FIG. 3 is a block diagram illustrating a video decoder.

FIG. 3—MPEG Decoder Block Diagram

Referring now to FIG. 3, a block diagram illustrating one embodiment of the video decoder 74 which performs IDCT computations according to the present invention is shown. As shown, the video decoder 74 receives an encoded or compressed digital video stream and outputs an uncompressed digital video stream. The compressed digital video stream is a bitstream of compressed video data which is used to present a video sequence, such as a television segment or movie, onto a screen, such as a television or a computer system. In one embodiment, the compressed digital video stream is compressed using the MPEG-2 compression algorithm, and the video decoder 74 is thus an MPEG-2 decoder. Since the operation of MPEG decoders is well known in the art, details of their operation which are not necessary to the operation of the present invention are omitted for simplicity.

As shown in FIG. 3, the video decoder 74 comprises a Variable Length Decoding block 102 coupled to provide an output to an Inverse Scan block 104, which is coupled to provide an output to an Inverse Quantization block 106, which is coupled to provide an output to an Inverse DCT block 108, which is coupled to provide an output to a motion compensation block 110. The motion compensation block 110 provides an output comprising decoded samples. A frame store memory 112 is coupled to the output of the motion compensation block 10 to receive and store decoded frame data. The motion compensation block 110 is coupled to an output of the frame store memory 112 to receive reference block data from the frame store memory 112 during motion compensation.

As shown in FIG. 3, the Variable Length Decoding block 102 receives coded data and performs variable length decoding. As is well known, the MPEG standard provides that data is compressed for transmission using variable length codes. Thus the Variable Length Decoding block 102 decodes this data and produces an output, referred to as QFS[n]. The QFS[n]output of the Variable Length Decoding block 102 is provided to the Inverse Scan block 104. The Inverse Scan block 104 reverses the zig zag scan ordering of the received data (is this right) and produces an output referred to as QF[v][u]. The output QF[v][u] is provided to the Inverse Quantization block 106. The Inverse Quantization block 106 performs inverse quantization or de-quantizes the data to produce de-quantized data, referred to as F[v][u]. The output F[v][u] of the Inverse Quantization block 106 is provided to the Inverse DCT block 108, which performs the inverse discrete cosine transform to convert the data from the frequency domain back to the pixel domain. As discussed further below, the IDCT block 108 performs the IDCT with improved efficiency. The inverse DCT block 108 produces an output referred to as f[y][x]. The output f[y][x] of the inverse DCT block 108 is provided to the motion compensation block 110.

The output b[y][x] from the inverse DCT block 108 comprises temporally encoded frames of pixel data. The motion compensation block 110 decompresses the temporally compressed frames using motion compensation techniques. Output pixel values from the motion compensation block 110 are provided to a frame store memory 112. The frame store memory 112 is thus coupled to the motion compensation block 110 and stores one or more reference frames of video data. These reference frames of video data are used by the motion compensation block 110 in performing motion compensation on temporally compressed frames, such as P and B frames.

Figure 4:
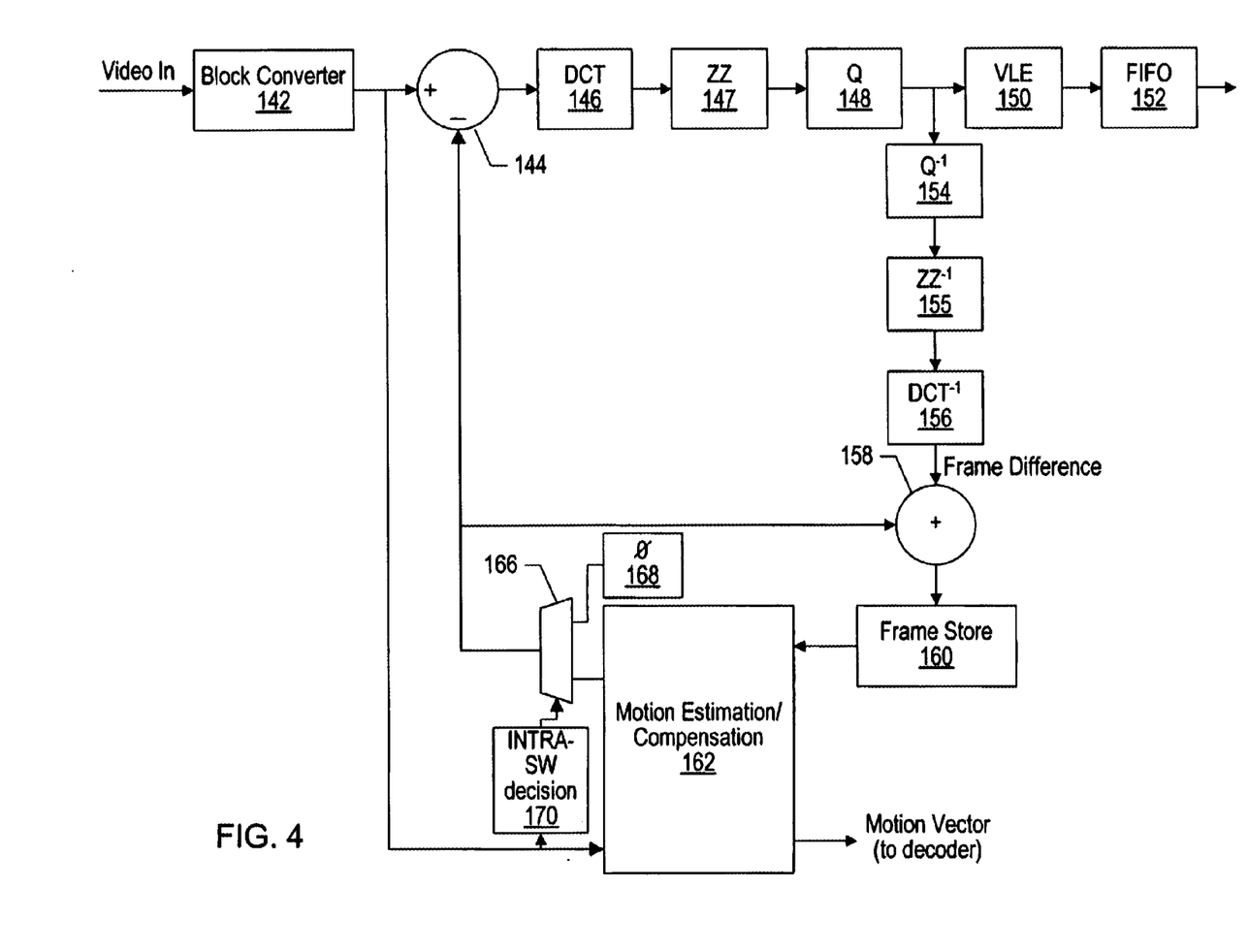
FIG. 4 is a block diagram illustrating a video encoder.

FIG. 4—MPEG Encoder Block Diagram

Referring now to FIG. 4, a block diagram illustrating an embodiment of video encoder 76 which performs the IDCT according to the present invention is shown. As shown, the video encoder 76 receives an uncompressed digital video stream and outputs an encoded stream. The uncompressed digital video stream is a bitstream of video data which is used to present a video sequence, such as a television segment or movie, onto a screen, such as a television or a computer system. In one embodiment, the video encoder 76 compresses the uncompressed digital video stream using the MPEG-2 compression algorithm.

As shown in FIG. 4, a block converter 142 converts input luminance and chrominance video signals to block format, where each block preferably comprises an 8×8 matrix of 64 pixel values. The block format is preferably implemented as a plurality of macroblocks grouped into particular spacing formats depending upon the particular type of encoding system, such as the standard 4:4:4, 4:2:2, 4:2:0 etc. spacing formats, for example. The block converter 142 provides sequential pixel values to a subtractor 144 and to motion estimation/compensation logic 162, described further below. The block converter 102 also provides an output to an Intra-SW decision block 170.

The subtractor 144 receives an input from a multiplexer 166 and operates to subtract the output of the multiplexer 166 from the output of the block converter 142. The multiplexer 166 receives inputs from the motion estimation/ compensation logic 162 and also receives a 0 input from block 168. The multiplexer 166 receives a select input from the Intra-SW decision block 170. The Intra-SW decision block 170 determines whether an interfield or intrafield mode is being used. In the interfield data mode, the multiplexer 166 provides the output from the motion estimation/ compensation block 162, and the subtractor 142 subtracts each block of a macroblock provided by motion estimation/ compensation logic 162 from a corresponding block provided from the block converter 142. In the intrafield data mode, the multiplexer 166 provides an output from the zero block 168, and thus the blocks from the block converter 142 pass through the subtractor 144 unmodified.

The subtractor 144 provides output blocks of motion-predicted, differentially encoded macroblocks (intermode) or unmodified output blocks (intramode) to a DCT converter 146. The DCT converter 146 converts each of the blocks to DCT format, resulting in corresponding 8×8 blocks of DCT coefficients. The DCT format expresses the data in the frequency domain for enabling compression of video data. For each DCT block, the first or top left coefficient typically comprises the DC component of the block, and the remaining values are AC components for increasing vertical and horizontal frequencies. The functionality described below in accordance with the present invention may be implemented by DCT converter 146.

The DCT coefficients from the DCT converter 146 are provided to a ZZ block 147 which reorders the pixels in a zig zag format. The output of the ZZ block 147 is provided to a quantizer 148, which maps sets of coefficient values into a quantized value. Smaller sets are typically used for the lower-frequency coefficients, i.e., fine quantization, than for the higher-frequency coefficients, since the human eye is less sensitive to image components at higher spatial frequencies than to components at lower spatial frequencies.

The data values from the quantizer 148 are provided to a variable length encoder (VLE) 150 for encoding the data for purposes of storage and/or transmission. The VLE 150 scans and converts the blocks of data to variable length codes (VLCs) according to the principles of entropy coding, where shorter codes are allocated to the more probable values to achieve coding gain and thus compression of the data. One such VLC coding scheme is referred to as Huffinan coding, although other coding schemes are contemplated. The VLCs are provided from the VLE 150 to a first-in first-out (FIFO) buffer 152.

For the interfield mode, the data values from the quantizer 148 are provided to an inverse quantizer 154 for reversing the operation performed by the quantizer 148 to produce approximate DCT coefficients representing each block of the encoded image. Since quantization is usually a lossy process, the output of the inverse quantizer 154 introduces noise and errors.

The output data of the inverse quantizer 154 is provided to an inverse ZZ block 155 which reverses the operation of the ZZ block 147. The output of the inverse ZZ block 155 is provided to an inverse DCT (IDCT) converter 156 for reversing the operation performed by the DCT converter 146. As discussed further below, the IDCT converter 156 preferably performs IDCT computations according to the present invention. The frame difference blocks at the output of the IDCT converter 156 are provided to one input of a two-input adder 158. The adder 158 also receives the output data blocks from the motion compensation logic 162. The output pixel values from the adder 158 are provided to a frame store memory 160, where the stored data may be provided to a video buffer (not shown) and displayed on a display device (not shown), such as a monitor.

The values in the frame store memory 160 are provided to the input of the motion estimation/compensation logic 162. In general, the motion estimation/compensation logic 162 compares the incoming block from the block converter 142 with the reconstructed previous block stored in the frame store memory 160 to measure motion in the form of motion vectors. The motion estimation/compensation logic 162 of FIG. 3 performs motion estimation in the spatial domain using prior art techniques.

The motion estimation/compensation logic 162 shifts objects or blocks to estimated positions in the new frame, resulting in predicted blocks. In the interfield mode, this predicted block is then subtracted from the input block to obtain a block difference or prediction error. This process separates interfame redundancy and the prediction error. In the interfield mode, the block difference is then processed by the DCT converter 146, ZZ block 147, and the quantizer 148 to remove spatial redundancy. Thus, in this method, motion estimation is performed in the spatial or pixel domain, and the frame difference is then DCT transformed and quantized.

Inverse DCT

As stated above, the computation of the inverse DCT may be performed in either video decoder 74 or video encoder 76. In one implementation the inverse DCT involves receiving unquantized DCT coefficient data, referred to as F[u][v], and performing the inverse discrete cosine transform to convert the data from the frequency domain back to the pixel domain. Inverse DCT operations are typically performed for a block of 8×8 data in many image and video compression applications. The inverse DCT produces an output referred to as b(x,y).

An 8-point one-dimensional IDCT is defined by $$b(x) = \sum_{u=0}^{7} \alpha(u)F(u)\cos\left[\frac{\pi(2x+1)u}{16}\right], \quad (1)$$

where F(u), u=0,1, ..., 7 are the DCT coefficients and b(x), x=0,1 ..., 7 are the spatial domain data. The normalization factors a(u) are $$\alpha(0) = \frac{1}{2\sqrt{2}}, \quad \alpha(u) = \frac{1}{2} \text{ for } (u = 1, 2, \ldots, 7).$$

The two-dimensional 8×8 IDCT is defined by $$b(x, y) = \sum_{u=0}^{7}\sum_{v=0}^{7} \alpha(u)\alpha(v)F(u,v)\cos\left[\frac{\pi(2x+1)u}{16}\right]\cos\left[\frac{\pi(2y+1)u}{16}\right], \quad (2)$$

where F(u,v), u=0,1 ..., 7, v=0,1 ..., 7 are the DCT coefficients arranged in an 8×8 array and b(x,y), x=0,1, ..., 7, y=0,1, ..., 7 are the spatial domain data It is noted that the two-dimensional IDCT is a separable transform, and can be calculated by applying a one-dimensional IDCT to the rows of the 8×8 block of coefficients and then to the columns, or in the reverse order.

The following set of equations is illustrative of an algorithm for performing a one dimensional DCT:

$b0$=input[0]*cos($\pi$*4/16);

$b1$=input[1]*cos($\pi$*1/16);

$b2$=input[2]*cos($\pi$*2/16);

$b3$=input[3]*cos($\pi$*3/16);

$b4$=input[4]*cos($\pi$*4/16);

$b5$=input[5]*cos($\pi$*3/16);

$b6$=input[6]*cos($\pi$*2/16);

$b7$=input[7]*cos($\pi$*1/16);

$v0$=$b0$+$b4$;

$v4$=$b0$−$b4$;

$v2$=$b6$*tan($\pi$*2/16)+$b2$;

$v6$=$b6$−$b2$*tan($\pi$*2/16);

$v7$=$b1$*tan($\pi$*1/16)−$b7$;

$v1$=$b1$+$b7$*tan($\pi$*1/16);

$v5$=−$b3$*tan($\pi$*3/16)+$b5$;

$v3$=$b3$+$b5$*tan($\pi$*3/16);

$b0$=$v0$+$v2$;

$b2$=$v0$−$v2$;

$b4$=$v4$+$v6$;

$b6$=$v4$−$v6$;

$b3$=$v7$+$v5$;

$b5$=($v7$−$v5$);

$b1$=($v1$−$v3$);

$b7$=$v1$+$v3$;

$v5$=($b1$+$b5$)*cos($\pi$*4/16);

$v1$=($b1$−$b5$)*cos($\pi$*4/16);

output[0]=($b0$+$b7$);

output[7]=($b0$−$b7$);

output[1]=($b6$+$v5$);

output[6]=($b6$−$v5$);

output[2]=($b4$+$v1$);

output[5]=($b4$−$v1$);

output[3]=($b2$+$b3$);

output[4]=($b2$−$b3$);

The above set of equations for implementing the one dimensional IDCT includes eight scale operations on the input[0]-input[7] to obtain a set of pre-scaled parameters b0–b7. Eight additional multiply operations and twenty-six addition operations are subsequently performed to calculate the output vector output[0]- output[7].

Figure 5:
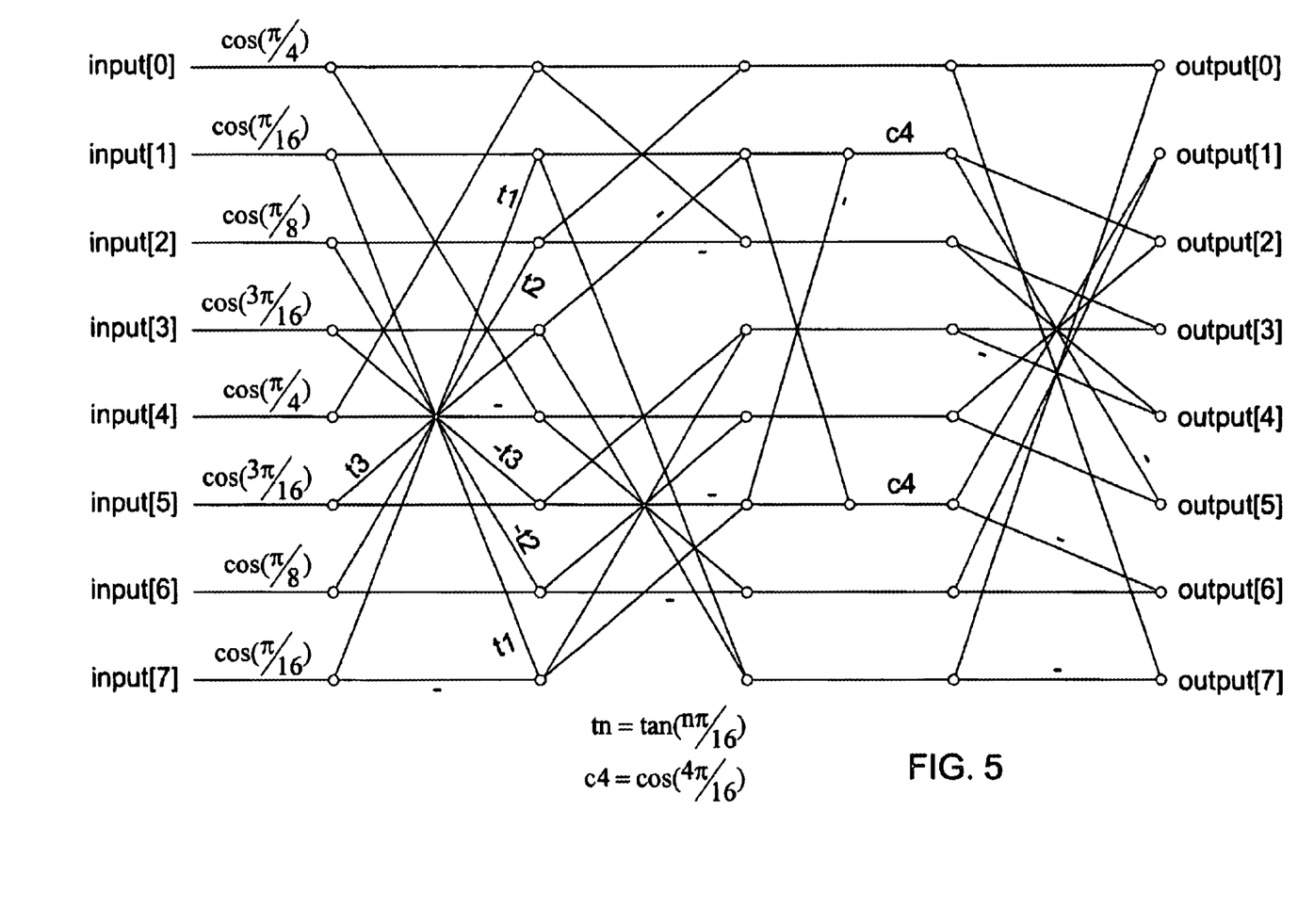
FIG. 5 is a diagram that illustrates an operator applied to input coefficients for performing a one-dimensional IDCT.

FIG. 5 illustrates an operator which is applied to the input coefficients input[0]–input[7]. It is noted that the operator of FIG. 5 is an equivalent representation of the equations expressed above. It is further noted that the merging of two lines into a node represents an addition operation, that a parameter appearing adjacent to a line represents a multiplication operation, and that a minus sign (−) adjacent to a line represents the negation of a value.

To extend the IDCT algorithm expressed above and illustrated in FIG. 5 to the calculation of two dimensional DCT calculations as employed within video encoding and decoding systems, the algorithm may first be applied column-wise to each column vector of the input array of DCT coefficients to compose an intermediary array, and then applied again row-wise to each row vector of the composed intermediary array to form the output array. Such computation would require 128 multiplications for pre-scaling, 128 additional multiplications, and 416 add operations.

Figure 6:
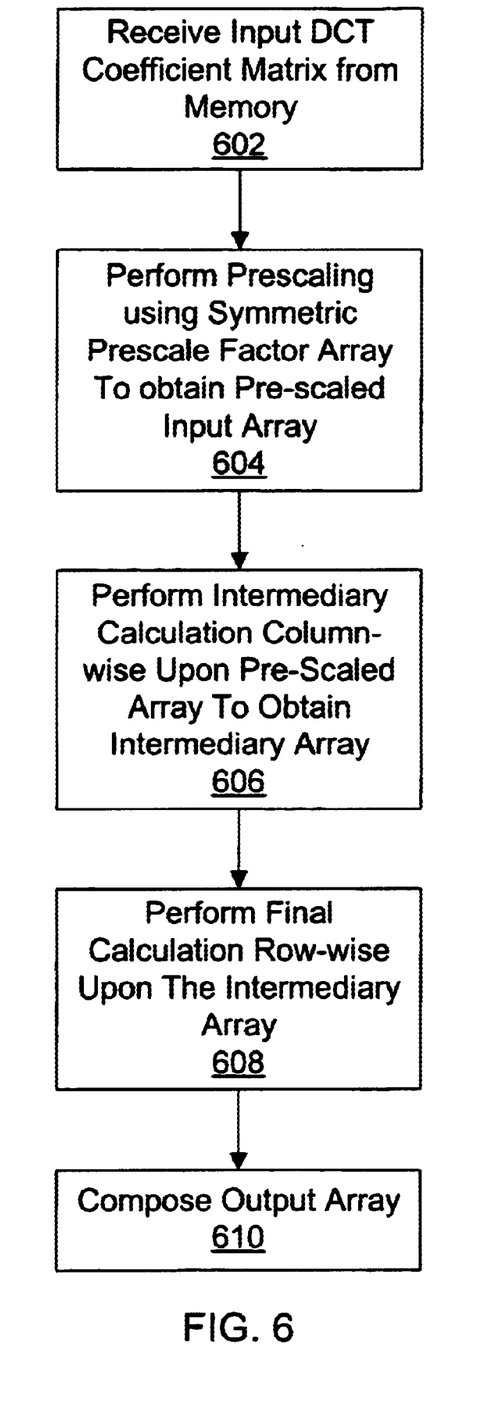
FIG. 6 is a diagram illustrating a method of performing a two-dimensional IDCT.

Accordingly, turning next to FIG. 6, a method is illustrated wherein an input array of DCT coefficients is pre-scaled prior to performing row-wise and column-wise intermediary calculations upon the data. More specifically, in one implementation, an element-wise multiplication (i.e., a term by term product) is performed upon the coefficients of an input DCT array and a set of pre-scale constants forming a symmetric pre-scale factor array wherein corresponding elements from each array are multiplied together. Upon performing the element-wise multiplication to compose a pre-scaled input array, subsequent column-wise and row-wise calculations are performed to compose the output array of spatial data. Further details regarding aspects of one implementation are next provided. Reference to the specific steps of FIG. 6 will be made at various points in the following discussion.

Derivation of the coefficients forming the symmetric pre-scale factor array are next considered. FIG. 7 illustrates the symmetric pre-scale factor array P wherein the values a–h represent the following constants:

$a = \cos(4\pi/16)$ $b = \cos(\pi/16)$ $c = \cos(2\pi/16)$ $d = \cos(3\pi/16)$ $e = \cos(4\pi/16)$ $f = \cos(3\pi/16)$ $g = \cos(2\pi/16)$ $h = \cos(\pi/16)$ It is noted that the matrix P is a symmetrical matrix wherein its transpose is equivalent. It is further noted that the parameters a–h correspond to the scaling values applied in the one dimensional IDCT algorithm described above and illustrated in FIG. 5. It is finally noted that the parameters a and e, b and h, c and g, and d and f are equal. Thus, the values for each of these parameters may be expressed using a single parameter. Separate letter designators for each parameter are used herein to illustrate the correspondence between the scaling factors employed in the one dimensional IDCT algorithm described above.

FIG. 7 further illustrates a manner in which the symmetric pre-scale factor array P may be derived or expressed. Specifically, the symmetric pre-scale factor array P may be expressed by the following equation:

$P = M \times U \times M$, where U is a matrix of coefficients all being equal to 1, and M is a matrix wherein the equal row-column diagonal consists of the scaling factors a–h and wherein the remaining coefficients are 0.

Figure 8:
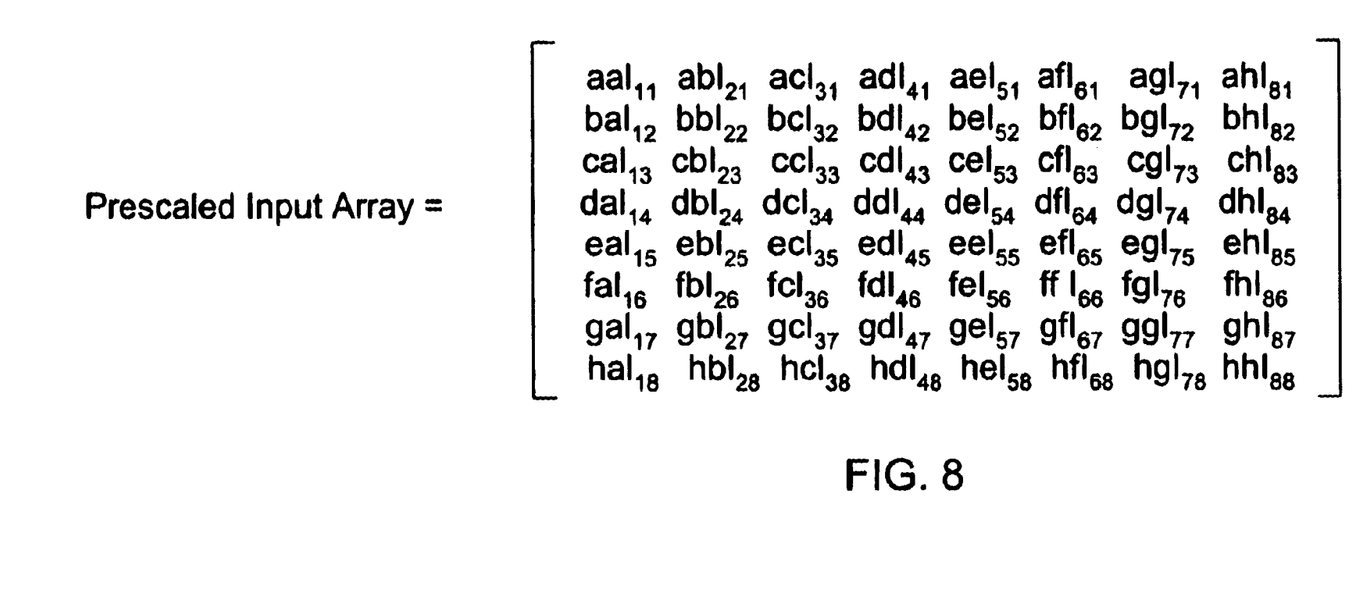
FIG. 8 is a diagram illustrating a pre-scaled input array.

In accordance with the method illustrated in FIG. 6, during step 602, a set of input DCT coefficients forming a DCT coefficient matrix are retrieved from memory and during step 604, pre-scaling is performed using the symmetric pre-scale array P of FIG. 7. More specifically, in one implementation an element-wise multiplication (i.e., a term by term product) is performed upon each element $I_{ij}$ of the input array of DCT coefficients and upon each corresponding element of the symmetric pre-scale factor array P wherein corresponding elements from each matrix are multiplied. The resulting pre-scaled input array is illustrated in FIG. 8.

The pre-scaling operations performed to derive the pre-scaled input array may be implemented using a pseudo code fragment as follows:

for($i=1$; $i<=8$; $i++$)

for ($j=1$; $j<=8$; $j++$)

Pre-scaled Input Array $(i,j) = P(i,j) * I(i,j)$

As illustrated by step 606 of FIG. 6, after the pre-scaled input array is calculated by performing the pre-scaling operations, an intermediary calculation may be performed column-wise upon each column vector of the pre-scaled input array to obtain an intermediary array. In one specific implementation, these intermediary calculations are performed by applying the operator of FIG. 9 to each column vector of the pre-scaled input array. For an 8×8 pre-scaled input array, thus, a total of eight column vectors are applied to the operator of FIG. 9 to provide an 8×8 intermediary array. It is noted that the operations of FIG. 9 include the calculations of the one dimensional IDCT algorithm described above, with the exception of the scaling operations.

During step 608 of FIG. 6, a final calculation is performed row-wise upon each row vector of the intermediary array composed during step 606. In one implementation, the final calculation includes applying each row vector of the intermediary array to the operator of FIG. 9. Thus, for an 8×8 pre-scaled input array, and thus for an 8×8 intermediary array, eight row vectors are applied to the operator of FIG. 9 to thereby generate an 8×8 output array. During step 610, the output array is composed and stored to memory. It is noted that the final calculation performed upon each row vector of the intermediary array again includes the calculations of the one dimensional DCT algorithm described above, exclusive of the scaling operations.

Figure 10:
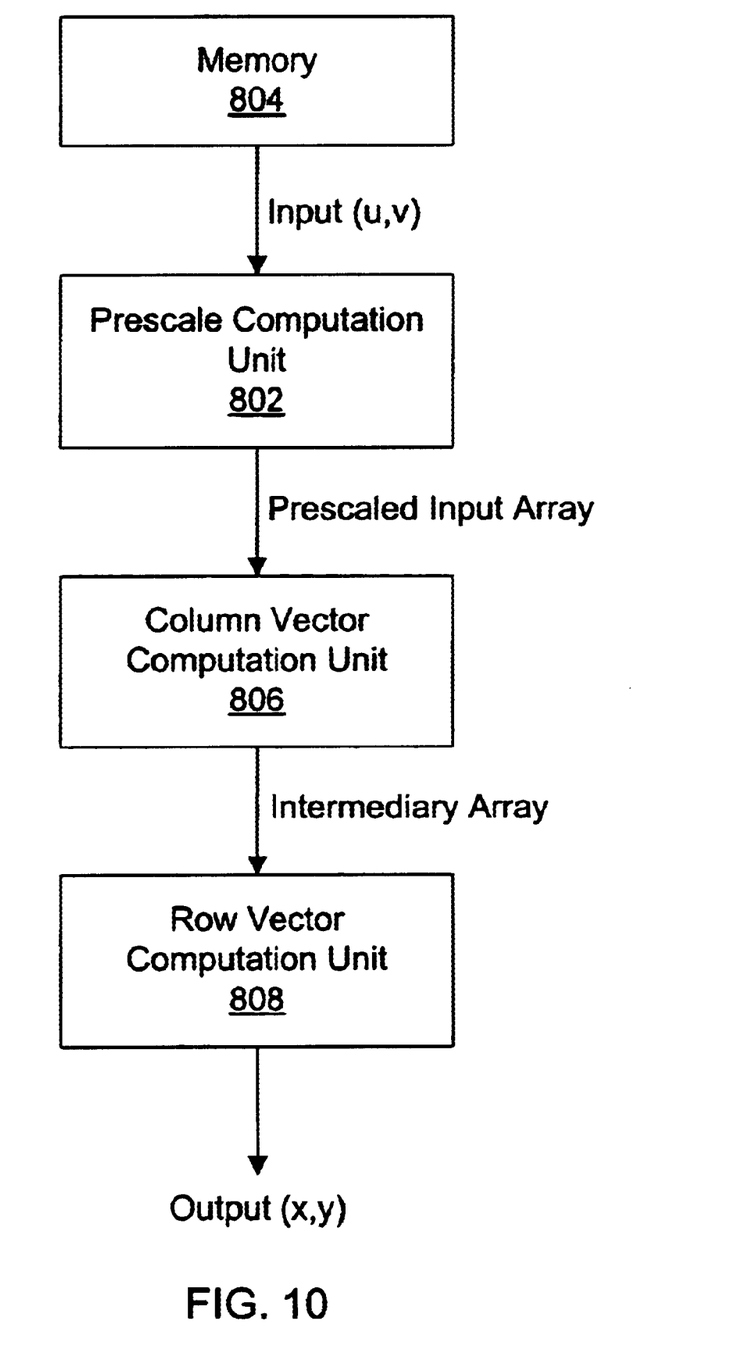
FIG. 10 is a functional block diagram illustrating functionality of an IDCT unit.

FIG. 10 is a functional block diagram illustrating functionality of an IDCT unit implementing the functionality described above. The functional block diagram of FIG. 10 includes a pre-scale computation unit 802 coupled to a memory 804 and to a column vector computation unit 806. A row vector computation unit 808 is further shown coupled to column vector computation unit 806. It is noted that pre-scale computation unit 802, column vector computation unit 806 and row vector computation unit 808 may be implemented in either software or hardware, or a combination thereof.

Memory 804 is employed to store an input array of DCT coefficients for which transformation to spatial data is desired. Pre-scale computation unit 802 is configured to retrieve the input coefficients from memory 804 and to perform the pre-scaling operation described above wherein the input coefficients are pre-scaled using an element-wise multiplication with a symmetric pre-scale factor array. The result of the pre-scaled input array is then provided to column vector computation unit 806 which performs the column-wise computations as described above to generate an intermediary array. The row vector computation unit 808 finally operates upon the intermediary array as described above to generate the output array of spatial data.

Figure 9:
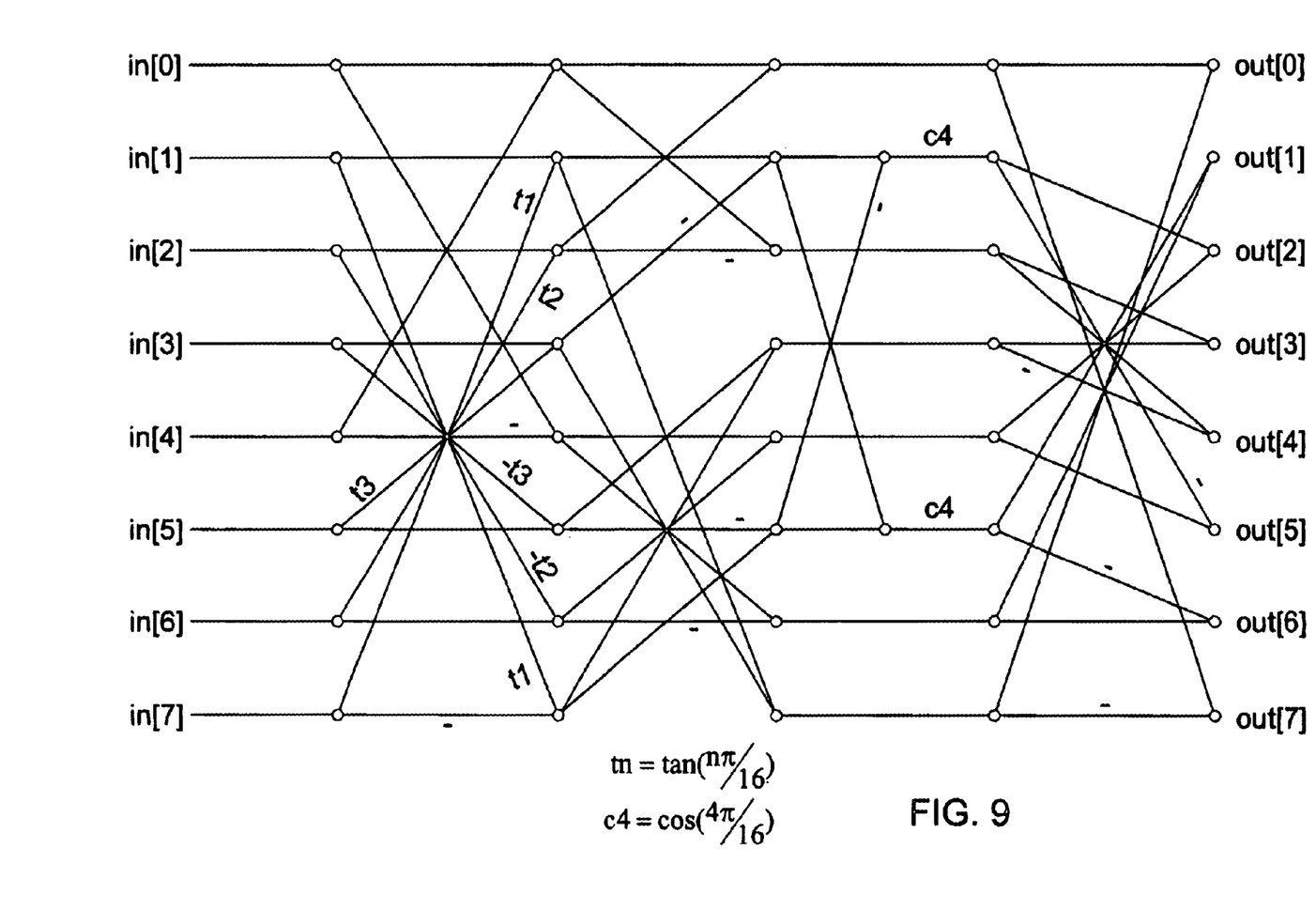
FIG. 9 is a diagram of an operator applied to a pre-scaled input array and to an intermediary array.

It is noted that in the embodiment described above, after generating the pre-scaled input array, a column-wise intermediary calculation as illustrated, for example, in FIG. 9 is performed upon each column vector of the pre-scaled input array. Subsequently, row-wise calculations are performed. In another embodiment, an equivalent result is obtained by first performing a row-wise calculation upon each row vector of the pre-scaled input array by applying the operator of FIG. 9 to thereby compose an intermediary array. Subsequently, column-wise calculations may be performed upon each column vector of such an intermediary array to generate the output array of spatial data.

It is noted that in the embodiments described above, since pre-scaling is performed upon the input array of DCT coefficients using a symmetric pre-scale factor array, separate scaling multiplications are not required for both the row-wise calculations and column-wise calculations. Accordingly, for the embodiments described above, a total of 64 multiplications are required for pre-scaling, an additional 128 multiplications are required for the intermediary and final calculations, and 16×26 addition operations are required. Thus, half the number of multiplications required for performing scaling operations are required. A video compression or decompression employing an IDCT unit which implements the methodology described may advantageously attain higher performance.

It is further noted that all of the constants to which the input DCT coefficients are multiplied and that each of the constants used to perform the intermediary and final calculations are smaller than 1. Thus, the calculations for performing the IDCT methodology as described above may be advantageously suited for fixed point implementations, thus also accommodating higher performance. Finally, since the pre-scaling operations are performed prior to a row-wise or column-wise intermediary and final calculations, the pre-scaling may be merged with quantization coefficients as may be employed in quantization units.

Forward DCT

The forward DCT may further be performed within a DCT unit by implementing post-scaling of an array. In such an implementation, row-wise (or column-wise) calculations are performed in the reverse from that described above to obtain an intermediary array, and then column-wise (or row-wise) calculations are performed upon the intermediary array. In other words, the respective row-wise and column-wise calculations may be performed by applying the operator of FIG. 9 from right to left upon the input spatial data and intermediary data, respectively. Post-scaling is then performed upon the resultant array by element-wise multiplication (or division) of corresponding elements of a symmetric post-scaling factor array similar to the array P described above. Similar efficiencies in a video system as those described above may be attained by using such a DCT unit Although the system and method of the present invention has been described in connection with the described embodiments, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A method for performing a forward discrete cosine transform (DCT) upon a matrix of image data in a video system, the method comprising:

performing a column-wise calculation upon each column of said matrix of image data to obtain an intermediary array;

performing a row-wise calculation upon each row of said intermediary array to obtain an unscaled DCT array; and multiplying said unscaled DCT array element-wise with corresponding elements of a symmetric post-scale factor array to produce an output DCT array which represents the image data in a frequency domain;

wherein said symmetric post-scale factor array is an array expressible by the product M×U×M, wherein U is a matrix of coefficients each being equal to 1, wherein M is an array having a set of post-scale constants along a diagonal and all zeros off the diagonal, wherein said set of post-scale constants are taken from the collection of values defined by $\cos(n\pi/16)$, where n=1, 2, 3, 4.

2. The method for performing a forward discrete cosine transform as recited in claim 1 further comprising retrieving each element of said matrix of data from a memory.

3. A method for performing a forward discrete cosine transform (DCT) upon a matrix of image data in a video system, the method comprising:

performing a row-wise calculation upon each row of said matrix of image data to obtain an intermediary array;

performing a column-wise calculation upon each column of said intermediary array to obtain an unscaled DCT array; and multiplying said unscaled DCT array element-wise with corresponding elements of a symmetric post-scale factor array to produce an output DCT array which represents the image data in a frequency domain;

wherein said symmetric post-scale factor array is an array expressible by the product M×U×M, wherein U is a matrix of coefficients each being equal to 1, wherein M is an array having a set of post-scale constants along a diagonal and all zeros off the diagonal, wherein said set of post-scale constants are taken from the collection of values defined by $\cos(n\pi/16)$, where n=1, 2, 3, 4.

4. The method for performing a forward discrete cosine transform as recited in claim 3 further comprising retrieving each element of said matrix of data from a memory.

5. A discrete cosine transform calculation unit for a video system, configured to perform a discrete cosine transform (DCT) upon a matrix of image data, said discrete cosine transform calculation unit comprising:

a column vector computation unit configured to perform a column-wise calculation upon each column of said matrix of image data to obtain an intermediary array;

a row vector computation unit configured to perform a row-wise calculation upon each row of said intermediary array to obtain an unscaled DCT array; and a postscale computation unit configured to multiply said unscaled DCT array element-wise with corresponding elements of a symmetric post-scale factor array to produce an output DCT array which represents the image data in a frequency domain;

wherein said symmetric post-scale factor array is an array expressible by the product M×U×M, wherein U is a matrix of coefficients each being equal to 1, wherein M is an array having a set of post-scale constants along a diagonal and all zeros off the diagonal, wherein said set of post-scale constants are taken from the collection of values defined by $\cos(n\pi/16)$, where n=1, 2, 3, 4.

6. A discrete cosine transform calculation unit for a video system, configured to perform a discrete cosine transform (DCT) upon a matrix of image data, said discrete cosine transform calculation unit comprising:

a row vector computation unit configured to perform a row-wise calculation upon each row of said matrix of image data to obtain an intermediary array;

a column vector computation unit configured to perform a column-wise calculation upon each column of said intermediary array to obtain an unscaled DCT array; and a postscale computation unit configured to multiply said unscaled DCT array element-wise with corresponding elements of a symmetric post-scale factor array to produce an output DCT array which represents the image data in a frequency domain;

wherein said symmetric post-scale factor array is an array expressible by the product M×U×M, wherein U is a matrix of coefficients each being equal to 1, wherein M is an array having a set of post-scale constants along a diagonal and all zeros off the diagonal, wherein said set of post-scale constants are taken from the collection of values defined by $\cos(n\pi/16)$, where n=1, 2, 3, 4.

* * * * *